Figure 1:
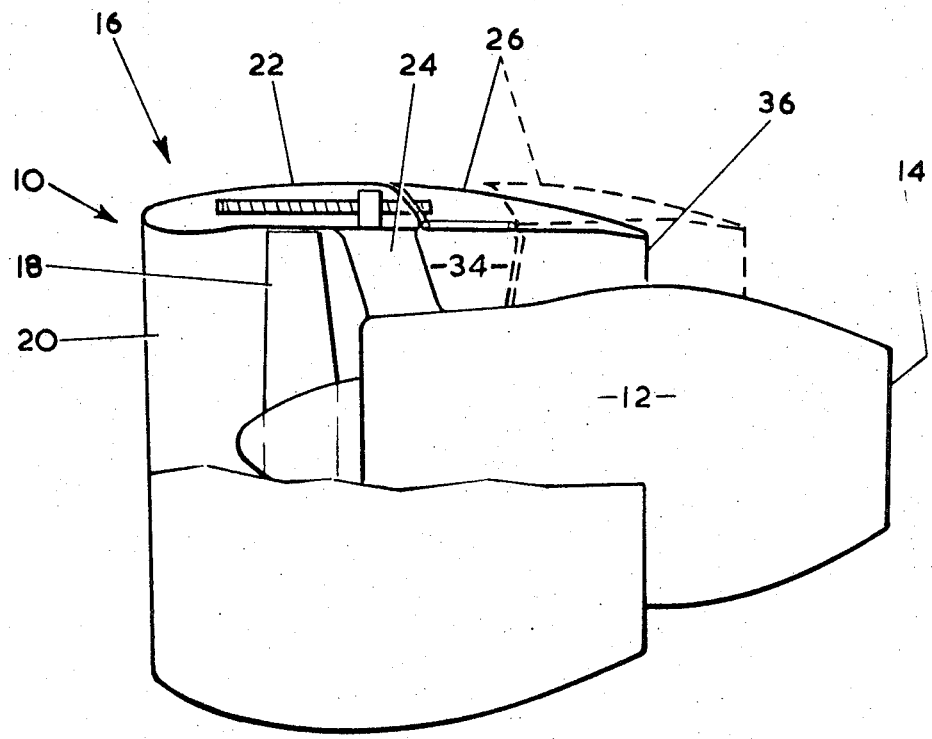

United States Patent [19]
Sutton

[11] 3,717,304
[45] Feb. 20, 1973

[54] THRUST REVERSER FOR FLUID FLOW ENGINE

[75] Inventor: Julian MacDonald Davison Sutton, Linby, England

[73] Assignee: Rolls Royce Limited, Derby, England

[22] Filed: May 3, 1971

[21] Appl. No.: 139,693

[30] Foreign Application Priority Data

May 6, 1970  Great Britain.....................21,810/70

[52] U.S. Cl............................................239/265.19
[51] Int. Cl...........................B63h 11/10, B64c 15/00
[58] Field of Search.......239/265.19, 265.25, 265.27, 239/265.29, 265.31

[56] References Cited

UNITED STATES PATENTS

| | | | |
|---|---|---|---|
| 3,262,268 | 7/1966 | Beavers | 239/256.19 X |
| 3,262,269 | 7/1966 | Kutney et al. | 239/265.19 X |
| 3,262,271 | 7/1966 | Beavers | 239/265.19 X |

Primary Examiner—Lloyd L. King
Attorney—Cushman, Darby & Cushman

[57] ABSTRACT

Gas turbine ducted fan engines having short intakes suffer from re-ingestion problems when reverse fan thrust is selected. The present invention profiles the column of reversed fan air so that it presents a weaker front to the ambient airstream which is able to peel off the reversed fan air from the cowl before re-ingestion occurs.

7 Claims, 9 Drawing Figures

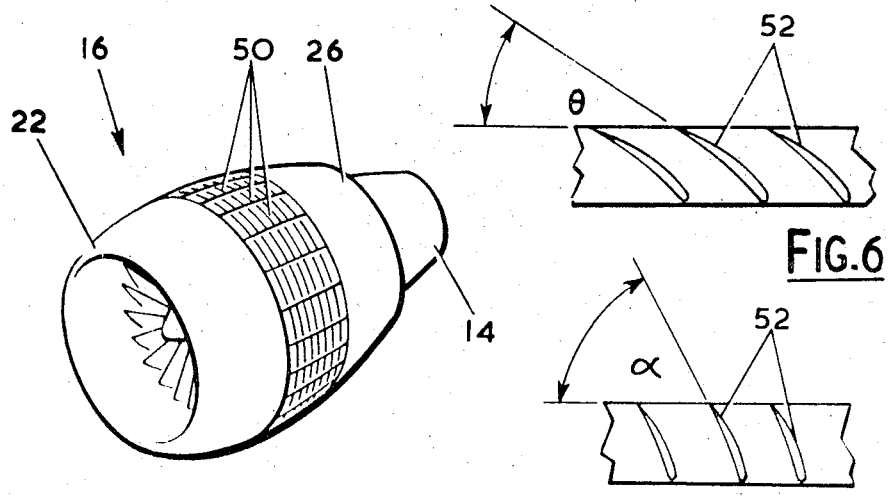
FIG. 5
FIG. 6
FIG. 7
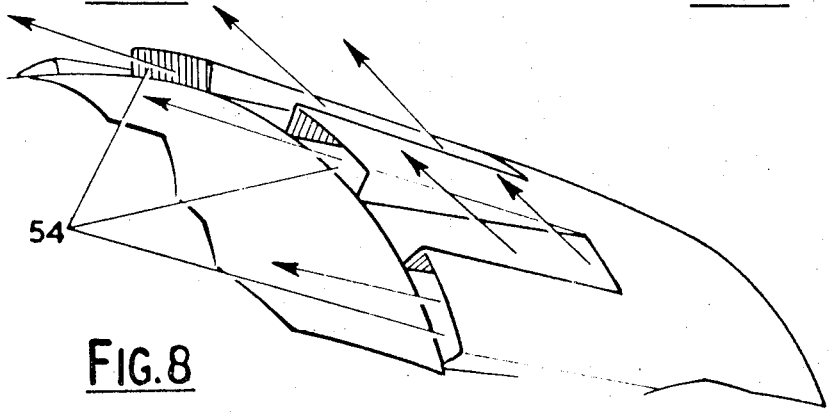
FIG. 8
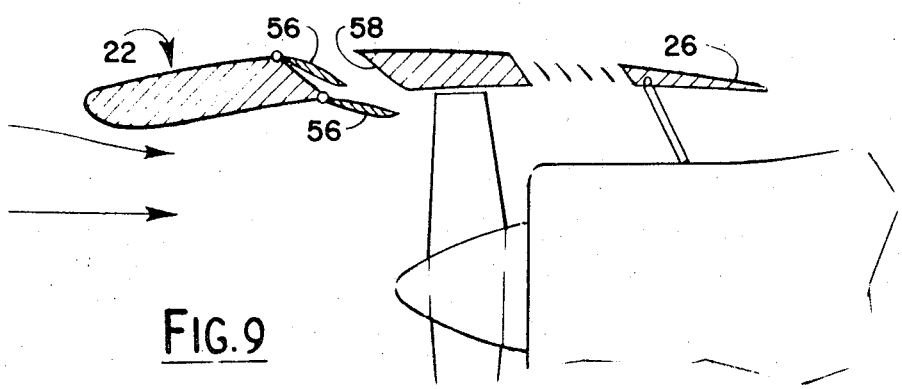
FIG. 9

THRUST REVERSER FOR FLUID FLOW ENGINE

This invention concerns thrust reversers for gas turbine ducted fan engines.

As is known in the art, thrust reversers which are provided in the fan cowls of gas turbine ducted fan engines for use as powerplants on aircraft normally comprise a fan cowl, a portion of which is movable so as to be moved away from the static portion and thereby open a gap between the two portions, through which gap fan air can flow, radially outwardly of the engine axis. The mating faces of the static and movable portions are shaped so as to give to the fan air flowing through the gap a forward component so as to provide a reverse thrust effect. This forward component is greatly increased when measured angularly relative to the engine axis if the cowl lip which defines the upstream edge of the gap mentioned heretofor is formed with a smooth aerodynamically efficient surface. Forming the lip thus encourages the deflected fan air to adhere thereto and onto the outer surface of the cowl, by virtue of the "Coanda" effect as described in Rolls-Royce Ltd's U.S. Pat. No. 3,497,165 Sutton et al. issued Feb. 24, 1970. However, when what is known in the art as a "Short Cowl" fan engine is required, that is, a fan cowl with a very short air intake length, the Coanda effect is so efficient at making the reversed fan air adhere to the cowl outer surface, that serious re-ingestion problems arise, for ambient air, acting in a direction opposite to the flow of reversed air, when an aircraft on which the engine is mounted is landing, does not have time to mix with and "peel" the reversed air from the cowl outer surface before the reversed air has reached the fan air intake lip. Thus it is an object of this invention to provide a fan air thrust reverser which will cause the "Coanda" effect to work on reversed fan air, but after the benefit has been derived therefrom will permit mixing with and peeling off of the reversed air from the cowl outer surface before the reversed air reaches the fan air intake lip.

Accordingly the present invention comprises a gas turbine ducted fan engine fan cowl having a substantially annular portion which is movable so as to form an aperture through which, in operation, fan air flows radially outwardly of the cowl axis and the shape of which is such that the outer flow profile of said fan air is corrugated.

The aperture shape may include a scalloped downstream edge.

Preferably, though not restrictively, the scallops are of equal proportions.

Alternatively the aperture shape may take the form of discreet nozzles equally spaced about the cowl axis.

A further alternative could comprise a number of cascade vane assemblies alternate assemblies having more acute outlet angles than assemblies adjacent thereto.

Preferably the substantially annular cowl portion which is movable, moves axially of the remainder of the cowl so as to form said aperture.

Preferably though not restrictively, the direction of said movement is downstream, that is, the direction in which fan air normally flows when reversal thereof is not taking place.

Figure 2:
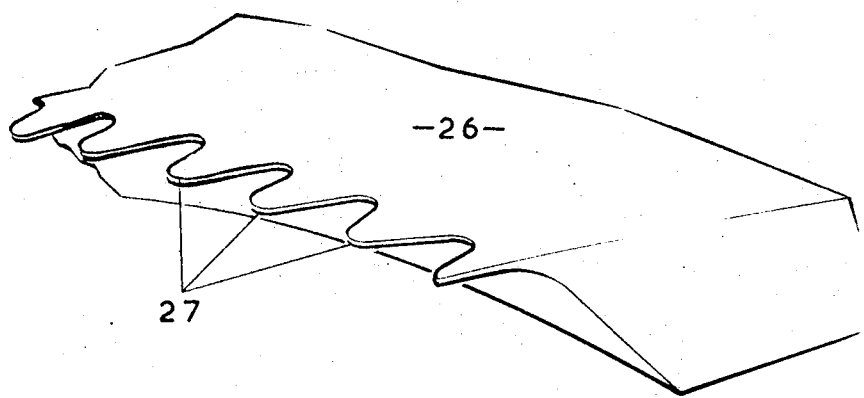
Figure 3:
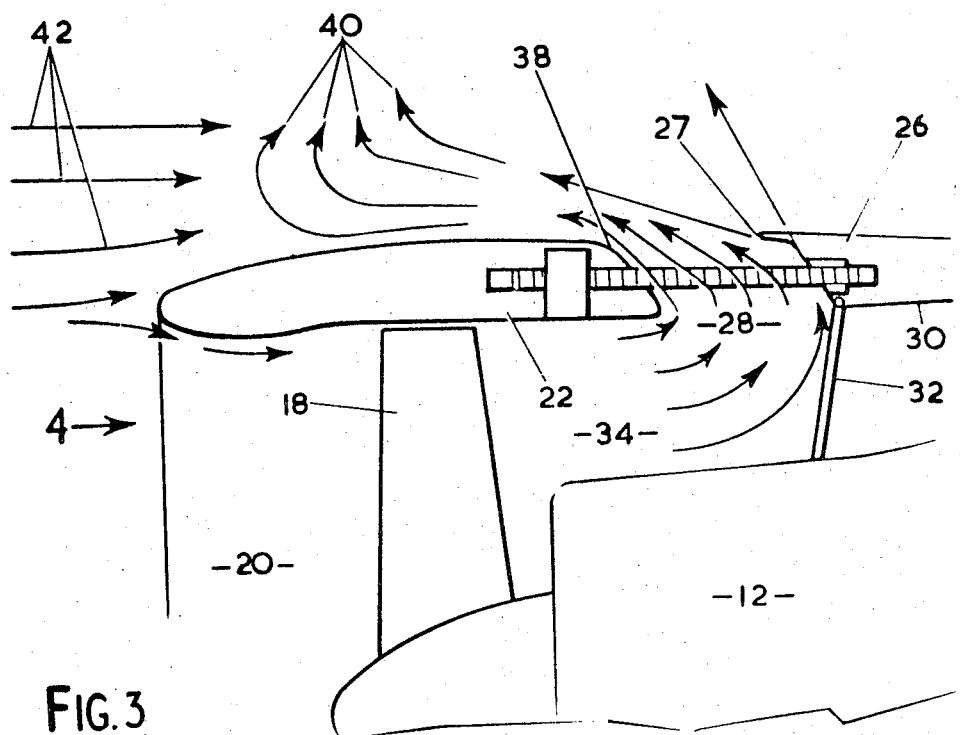
Figure 4:
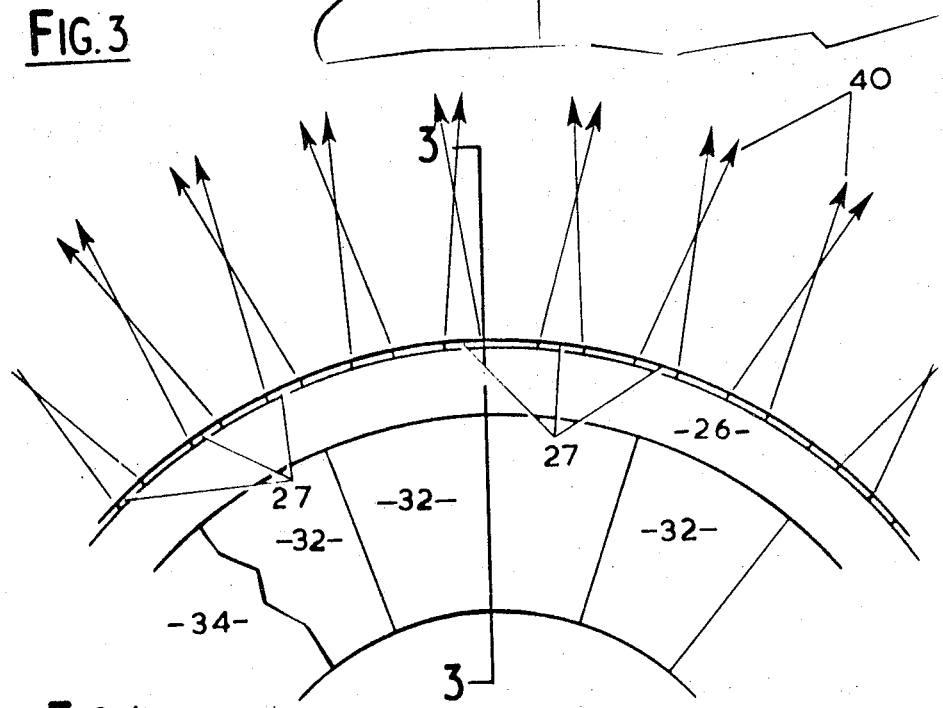

The invention will now be described with reference to the accompanying drawings in which:

FIG. 1 is a diagrammatic view of a gas turbine ducted fan engine,

FIG. 2 is a fragmentary perspective view of the downstream edge of the aperture formed in the fan cowl, FIG. 3 is an axial part cross-sectional view on line 3—3 of FIG. 4, FIG. 4 is a view on arrow 4 of FIG. 3, FIG. 5 is a perspective view of a gas turbine ducted fan engine having a modified fan cowl, FIG. 6 is a fragmentary view of one set of cascade vanes of the fan cowl of FIG. 5, FIG. 7 is a fragmentary view of a second set of cascade vanes of the fan cowl of FIG. 5, FIG. 8 is a perspective fragmentary view of a further modified fan cowl thrust reverser structure, and FIG. 9 is a partly sectional view of a further modified fan cowl with the engine shown diagramatically.

In FIG. 1 a gas turbine ducted fan engine is indicated generally by the numeral 10.

The engine comprises a core engine 12 which includes compressor, combustion equipment and expansion turbine, none of which are shown, and an exhaust nozzle 14, the core engine 12 being surrounded by a fan cowl 16. A stage of fan blades 18 is rotatably and coaxially mounted at the upstream end of core engine 12 and the fan stage is also surrounded by cowl 16 which provides an air intake 20 for the fan. As can be seen in FIG. 1 the air intake portion is very short, its lip being only approximately one fan blade chord width away from the leading edge of the fan stage. It is to be understood however, that this example is not intended to be limitive.

Fan cowl 16 comprises two portions, an upstream portion 22 fixed to a space from one engine 12 by radial struts 24 a number of which are spaced equi-angularly around core engine 12, and a translatable, downstream portion 26. Portion 26 is translatable, by means of a ball screw and nut mechanism, but which may be replaced by any of the translating means known in the art, to a position shown in dotted lines on FIG. 1 and full lines in FIG. 3. Such translation creates an aperture 28.

The inner wall 30 of cowl 16 is provided with a plurality of fan duct blocker flaps 32 in known manner and these flaps are pivoted across the fan duct 34 so as to prevent fan air from flowing straight through the duct and out of fan nozzle 36. Simultaneously with the blocking of fan duct 34, the aperture 28 is created and the fan air deflected therethrough to atmosphere, by blocker flaps 32.

The structure which forms the upstream edge 38 of aperture 28 is made very smooth and is of such a shape that when the engine is operating, it encourages deflected fan air which is flowing thereover to closely adhere thereto thus bringing into being the coanda effect. This is described in Rolls-Royce Limited's U.S. Pat. No. 3,497,165 and, as stated in that Patent, a substantial reverse thrust effect is obtained as a result of the coanda effect.

In order to assist ambient air to first mix with and then peel the air from the outer surface of cowl portion 22 before it reaches the lip of the cowl, the edge of downstream cowl portion 26 which forms the downstream edge of aperture 28, is scalloped as shown at 27 in FIG. 2. The reversed fan air flows over the scallops and as a result air streams 40 having a corrugated profile are set up in the outer layers of the reversed air flow. The corrugated profile extends inwardly of the reversed air flow to a depth which does not quite reach the upstream cowl portion outer surface. However, mixing is promoted and the ambient air cools the reversed air and reduces its velocity to a value equal to or less than the apparent velocity of the ambient air, whereupon the ambient air peels off the reversed air from the cowl before it reaches the intake lip, thereby preventing re-ingestion with its attendant undesirable pressure rise, bad pressure distribution at the fan face and temperature rise of the intake air, at least at all aircraft forward speeds where reverse thrust is required.

In FIG. 3 arrows 40 indicate reversed air flow and arrows 42 ambient air flow.

It is to be appreciated that although scallops 27 are shown to be of curved form, they could be rectangular or saw toothed or any like form. The criteria is peripheral length of the scallops relative to the circumferential length of the fan cowl measured in the same plane and for a given fan cowl longitudinal length.

In FIGS. 5 to 7 a further aperture arrangement is shown wherein a number of frames 50 surround duct 34. Each frame has a cascade of vanes 52 therein and the vanes 52 in alternate frames lie at an angle $\theta$ to the axis of cowl 16 and the vanes in the frames adjacent thereto lie at an angle $\alpha$ to said axis, angle $\alpha$ being less acute than angle $\theta$. Thus the corrugated effect in the reversed airflow is obtained.

FIG. 8 shows yet another arrangement wherein discreet nozzles 54 restrict the expansion of radial columns of deflected air and so produce the corrugated effect.

Some engines are fitted with blow in doors in the intake as shown at 56 in FIG. 9 to increase intake area under certain conditions. The invention as described and claimed herein may be utilized with such engines, the downstream edges 58 of the blow in doors 56, when the doors are blown in, act as the intake lip.

It will be realized by those skilled in the art, that as aircraft forward speed reduces under the effect of reverse thrust, so the apparent speed of the ambient air will also reduce until it is at a value less than that of the reversed air. When this occurs, the reversed air will no longer be peeled off but maximum mixing will take place, by virtue of the scalloped profile of the reversed air. Re-ingestion will now take place but the intake temperature rise and velocity distortion will be acceptable because of the mixing.

I claim:

1. A gas turbine ducted fan engine fan cowl comprising upstream and downstream annular portions axially separable from each other to define an annular space therebetween, and at least two sets of air flow deflector means arranged to lie in alternate side-by-side relationship with each other circumferentially of said cowl, so as to be within said annular space when formed, one set of said air flow deflector means being positioned so that, in operation, fan air flowing therethrough is deflected at a first acute angle to a longitudinal axis of said fan cowl and the other set of said air flow deflector means being positioned so that, in operation, fan air flowing therethrough is deflected at a second acute angle to the longitudinal axis of said fan cowl.

2. A gas turbine ducted fan engine fan cowl fan cowl as claimed in claim 1 wherein at least one of the sets of air flow deflector means comprises a plurality of discrete nozzles.

3. A gas turbine ducted fan engine fan cowl as claimed in claim 1 wherein both sets of fan air flow deflector means comprises scallops formed on the upstream edge of said downstream annular cowl portion, said scallops providing a staggered edge whereby to effect differing angles of fan air flow.

4. A gas turbine ducted fan engine fan cowl as claimed in claim 1 wherein said one set of air flow deflector means comprises a plurality of cascades having vanes set at said first acute angle to the longitudinal axis of said fan cowl and wherein the other air flow deflector means comprises a plurality of cascades having vanes set at the second acute angle relative to the longitudinal axis of said fan cowl.

5. A gas turbine ducted fan engine fan cowl as claimed in claim 1 including means to provide an annular space in said upstream portion of said fan cowl to define a further upstream intake for said fan cowl.

6. A gas turbine ducted fan engine fan cowl as claimed in claim 1 including means to selectively cover said annular space.

7. A gas turbine ducted fan engine fan cowl as claimed in claim 6, in which said cover means includes means to axially move said downstream portion of said fan cowl relative to said upstream portion of said fan cowl.

* * * * *